United States Patent Office 3,352,898
Patented Nov. 14, 1967

3,352,898
PROCESS FOR PRODUCTION OF
BUNTE COMPOUNDS
John C. James, Melrose, Mass., assignor to Monsanto Research Corporation, St. Louis, Mo., a corporation of Delaware
No Drawing. Filed Oct. 27, 1964, Ser. No. 406,904
4 Claims. (Cl. 260—453)

ABSTRACT OF THE DISCLOSURE

An improved process for producing a thiosulfuric acid ester by the reaction of sodium bisulfite and a bis(aminoalkyl) disulfide acid addition salt. The improvement in the process involves maintaining the molar ratio of sodium bisulfite to the acid addition salt between about 5:1 and 30:1 and conducting the reaction in a solution comprising hydrogen peroxide in amounts corresponding to a molar ratio of peroxide to the acid addition salt from about 0.5:1 to about 10:1.

---

This invention relates to a method for the preparation of chemical compounds, and more particularly, to a novel method for the preparation of Bunte compounds.

Bunte compounds are compounds containing the group —$SSO_3M$, where M represents H or a cation, attached to a C atom of an organic radical. They are thus thiosulfuric acid esters. The organic radical attached to the thiosulfuric acid or thiosulfate salt group may be hydrocarbon or substituted hydrocarbon. When it is hydrocarbon substituted by an amino group, the acids form inner salts (zwitterions). These salts are considerably more stable than the hydrocarbylthiosulfuric acids, where the amino group is lacking, and have a variety of uses. For example, they may be used as intermediates for the preparation of surfactants (Brit. 439,177).

Bunte compounds can be produced by various routes. One useful route consists in converting a disulfide to the Bunte compound by reaction with sodium bisulfite, as represented by the equation

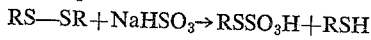

where R represents an organic radical. The byproduct, as will be seen, is a mercaptan. Thus half of the disulfide goes to mercaptan formation rather than undergoing conversion to the desired thiosulfuric acid compound, so that the theoretical yield limit is 50% based on disulfide charged. Handling and other losses, such as incomplete conversion, even with excess bisulfite, usually bring the practical yield limit down to 40–45%.

It is an object of this invention to provide a novel method of making Bunte compounds.

A particular object of this invention is to provide an improved method of making aminoalkyl Bunte compounds from disulfides.

Those and other objects will become evident upon consideration of the following specification and claims.

In accordance with this invention, a bis(aminoalkyl) disulfide is contacted with excess sodium bisulfite in an aqueous solution containing hydrogen peroxide, to produce aminoalkyl thiosulfuric acids in high yields, exceeding 50% of theoretical.

The production of yields in excess of 50% by the present process indicates that the mercaptan byproduct is being converted, probably by oxidation to the disulfide, to an intermediate which gives the desired thiosulfuric acid compound. Thus improved yields based on the amount of the disulfide charged are obtained.

The peroxide oxidant is convenient to use, since it can be incorporated directly into the aqueous reaction medium, and requires no extra equipment or steps to include it in the reaction mixture in order to raise the yield. Apparently the peroxide does not interfere with or attack the amine compounds present in the reaction mixture, except insofar as it may convert the mercaptan formed from the disulfide to material susceptible to conversion in this reaction mixture to the desired aminoalkylthiosulfuric acid compound. Reaction of the peroxide produces water, which will not alter the reaction mixture composition. Thus the present method substantially increases product yields without otherwise complicating or adversely affecting the desired reaction.

A wide variety of bis(aminoalkyl) disulfides are susceptible to the method of the invention for producing Bunte compounds in good yields.

These includes, for example, bis(aminoalkyl) disulfides in which the amino group is primary amino and the alkyl group is saturated hydrocarbon, as exemplified by 2,2'-dithiobis(ethylamine),
3,3'-dithiobis(propylamine),
3,3'-dithiobis(1-methylpropylamine),
3,3'-dithiobis(2-methylpropylamine),
3,3'-dithiobis(1,1-dimethylpropylamine),
2,2'-dithiobis(3-methylhexylamine),
2,2'-dithiobis(cyclohexylamine),
4,4'-dithiobis(butylamine),
2,2'-dithiobis(2-ethylbutylamine),
2,2'-dithiobis(2-ethylpentylamine),
2',2'-dithiobis(2-ethylhexylamine),
3,3'-dithiobis(dodecylamine),
2,2'-dithiobis(hexadecylamine), and the like.

They also include bis(aminoalkyl) disulfides in which the amino group is secondary amino. For example, these include bis(hydrocarbylaminoalkyl) disulfides in which the alkyl group is saturated aliphatic hydrocarbon, and the N-hydrocarbyl substituent is saturated aliphatic such as 2,2'-dithiobis(N-methylethylamine),
3,3'-dithiobis(N-methylpropylamine),
3,3'-dithiobis(N-ethylpropylamine),
2,2'-dithiobis(N,2-dimethylethylamine),
3,3'-dithiobis(N,2-dimethylpropylamine,
3,3'-dithiobis(N-propylpropylamine),
3,3'-dithiobis(N,1-dimethylpropylamine),
2,2'-dithiobis(N-methylcyclopentylamine),
2,2'-dithiobis(N-methylbutylamine),
6,6'-dithiobis(N-methylhexylamine),
4,4'-dithiobis(N-isopropyloctylamine),
4,4'-dithiobis(2-ethyl-N-methylhexylamine),
9,9'-dithiobis(N-methylnonylamine),
3,3'-dithiobis(N-decylpropylamine),
2,2'-dithiobis(N-methyltetradecylamine), and the like; or the N substituent is unsaturated aliphatic hydrocarbon such as 2,2'-dithiobis(N-allylethylamine),
2,2'-dithiobis[N-(4-vinylbutyl)propylamine],
2,2'-dithiobis[N-(3-cyclohexenyl)ethylamine],
3,3'-dithiobis(N-allylcyclohexylamine),
2,2'-dithiobis(N-2-propynylethylamine),
3,3'-dithiobis(N-2-propynylpropylamine),
7,7'-dithiobis(N-2-propynylheptylamine), and so forth; or the N substituent contains aromatic unsaturation such as 2,2'-dithiobis(N-phenylethylamine),
2,2'-dithiobis(N-p-tolylethylamine),
3,3'-dithiobis(N-phenylpropylamine),
2,2'-dithiobis[N-(p-t-butylphenyl)ethylamine],
4,4'-dithiobis[N-p-biphenylylbutylamine],
2,2'-dithiobis(N-α-naphthylethylamine),
5,5'-dithiobis(N-phenyldodecylamine), 2,2′-dithiobis(N-benzylethylamine),
3,3′-dithiobis(N-benzylbutylamine),
2,2′-dithiobis(N-phenethyl-4,4-dimethylhexylamine), and the like.

The stated secondary amino disulfides also include bis[(aminohydrocarbylamino)alkyl] disulfides, in which alkyl is saturated hydrocarbon and the terminal amino group may be either primary or substituted by hydrocarbon radicals. These are illustrated for example by disulfides containing saturated aliphatic hydrocarbon radicals such as 2,2′-[dithiobis(ethyleneimino)]bis(ethylamine),
2,2′-[dithiobis(ethyleneimino)]bis(2-methylethylamine),
3,3′-[dithiobis(ethyleneimino)]bis(propylamine),
2,2′-[dithiobis(trimethyleneimino)]bis(ethylamine),
2,2′-[dithiobis(ethyleneimino)]bis(butylamine),
4,4′-[dithiobis(tetramethyleneimino)]bis(butylamine),
4,4′-[dithiobis(1,2-butyleneimino)]bis(butylamine),
2,2′-[dithiobis(1,4-cyclohexyleneimino)]bis(ethylamine),
2,2′-[dithiobis(ethyleneimino)]bis(2-ethylhexylamine),
2,2′-[dithiobis(ethyleneimino)]bis(dodecylamine),
2,2′-[dithiobis(hexamethyleneimino)]bis(ethylamine),
2,2′-[dithiobis(trimethyleneimino)]bis(propylamine),
5,5′-[dithiobis(ethyleneimino)]bis(tetradecylamine),
2,2′-[dithiobis(2,2-dimethyltrimethyleneimino)]bis(hexylamine),
2,2′-[dithiobis(2,3-dibutyltetramethyleneimino)]bis(ethylamine),
2,3′-[dithiobis(ethyleneimino)]bis(N-methylethylamine),
3,3′-[dithiobis(hexamethyleneimino)]bis(N-butylpropylamine),
2,2′-[dithiobis(ethyleneimino)]bis(N-decylethylamine),
2,2′-[dithiobis(cyclobutyleneimino)]bis(N-methylethylamine),
2,2′-[dithiobis(ethyleneimino)]bis(N-dodecylethylamine),
2,2′-[dithiobis(ethyleneimino)]bis(N-cyclohexylpropylamine),
2,2′-[dithiobis(tetramethyleneimino)]bis(N-methylcyclohexylamine), and so forth;

and by bis(hydrocarbylaminoalkylaminoalkyl) disulfides containing unsaturation such as those containing aliphatic unsaturation such as 2,2′-[dithiobis(ethyleneimino)]bis(N-3-butynylethylamine),
2,2′-[dithiobis(ethyleneimino)]bis(N-allylethylamine),
4,4′-[dithiobis(tetramethyleneimino)]bis(N-allylbutylamine),
2,2′-[dithiobis(trimethyleneimino)]bis(N-allylethylamine),
2,2′-[dithiobis(ethyleneimino)]bis(N-2-butynylethylamine),
2,2′-[dithiobis(ethyleneimino)]bis(N-2-propynyldecylamine),
2,2′-[dithiobis(1,4-cyclohexyleneimino)]bis(N-2-propynylethylamine),
2,2′-[dithiobis(ethyleneimino)]bis(N-2-propynylethylamine),
2,2′-[dithiobis(1,2-decyleneimino)]bis(N-2-propynylethylamine), and so forth;

as well as those in which the terminal N hydrocarbon substituent contains aromatic unsaturation such as 2,2′-[dithiobis(ethyleneimino)]bis(N-phenylethylamine),
2,2′-[dithiobis(ethyleneimino)]bis(N-p-tolylethylamine),
2,2′-[dithiobis(ethyleneimino)]bis(N-naphthylethylamine),
3,3′-[dithiobis(ethyleneimino)]bis(N-phenylpropylamine),
3,3′-[dithiobis(ethyleneimino)]bis(N-phenylhexylamine),
2,2′-[dithiobis(trimethyleneimino)]bis(N-phenylhexadecylamine),
3,3′-[dithiobis(ethyleneimino)]bis[N-(p-t-butylphenyl)propylamine],
2,2′-[dithiobis(ethyleneimino)]bis(N-benzylethylamine),
2,2′-[dithiobis(ethyleneimino)]bis(N-phenethylethylamine),
2,2′-[dithiobis(hexamethyleneimino)]bis[N-(3-phenylpropyl)ethylamine],
4,4′-[dithiobis(ethyleneimino)]bis(N-p-biphenylylbutylamine),
2,2′-[dithiobis(1,2-propyleneimino)]bis(N-phenanthrylethylamine), and the like.

Still further, the bis(aminoalkyl) disulfides amenable to conversion to Bunte compounds by the present process may include oxygen atoms in their organic radicals. These are preferably oxy oxygen atoms, which may be either oxygen atoms joining alkyl radicals or substituted alkyl radicals, or hydroxyl groups as alkyl radical substituents. These oxy O atoms may be present in conjunction with aminoalkyl substituents of the aminoalkyl radicals.

Thus for example, the method of the invention may be applied to bis[N - (alkoxyalkyl)aminoalkyl] disulfides such as 2,2′-dithiobis[N-(2-ethoxyethyl)ethylamine],
2,2′-dithiobis[N-(2-ethoxypropyl)ethylamine],
3,3′-dithiobis[N-(2-ethoxyethyl)-1-propylamine],
2,2′-dithiobis[N-(2-butoxyethyl)-1-butylamine],
2,2′-dithiobis[N-(cyclohexoxyethyl)ethylamine],
2,2′-dithiobis[N-(dodecoxyethyl)ethylamine],
2,2′-dithiobis[N-(hexadecoxybutyl)hexylamine],
2,2′-dithiobis[N-(hexoxyethyl)ethylamine],
2,2′-dithiobis[N-(2-methoxyethyl)ethylamine],
2,2′-dithiobis[N-(2-methoxyethyl)-2-decylamine],
4,4′-dithiobis[N-(2-methoxyethyl)-2-butylamine],
2,2′-dithiobis[N-(6-methoxyhexyl)ethylamine],
2,2′-dithiobis[N-(6-hexoxynonyl)propylamine], and so forth;

as well as to bis[N-(hydrocarbyl-oxy-hydrocarbyl)alkylamine] disulfides such as those containing aromatic unsaturation such as 2,2′-dithiobis[N-(phenoxyphenyl)ethylamine],
2,2′-dithiobis[N-(benzyloxyphenyl)ethylamine],
2,2′-dithiobis[N-(2,4-xylyloxyethyl)ethylamine],
3,3′-dithiobis[N-(phenoxyethyl)propylamine],
4,4′-dithiobis[N-(phenoxypropyl)hexylamine],
4,4′-dithiobis[N-(phenethyloxyethyl)ethylamine],
9,9′-dithiobis[N-(phenoxyethyl)decylamine],
2,2′-dithiobis[N - (benzyloxyethyl)ethylamine], and the like;

and indeed, those containing aliphatic unsaturation such as 2,2′-dithiobis[N-(allyloxyethyl)ethylamine],
2,2′-dithiobis[N-(3-ethoxyallyl)ethylamine],
2,2′-dithiobis[N-(3-benzyloxyallyl)propylamine],
2,2′-dithiobis[N-(2-[2-butenyloxy]ethyl)ethylamine],
2,2′-dithiobis[N-(2-[2-cyclohexenyloxy]ethyl)butylamine],
2,2′-dithiobis[N-(4-ethoxy-2-butenyl)ethylamine],
2,2′-dithiobis[N-(8-benzyloxy-2-decenyl)ethylamine],
2,2′-dithiobis[N-(2 - [9-decenoxy]ethyl)hexylamine], and so forth.

Also, the presence of an ether O atom may be combined with the presence of a second amino N atom, as exemplified by 2,2′-dithiobis[N-(2-[2-methoxyethylamino]ethyl)ethylamine],
2,2′-dithiobis[N-(2-[2-ethoxyethylamino]ethyl)ethylamine],
2,2′-dithiobis[N1(3-[2-ethoxyethylamino]propyl)ethylamine],
4,4′-dithiobis[N-(2-[2-butoxypropylamino]hexyl)butylamine], 2,2'-dithiobis[N-(2-[3-cyclohexoxypropylamino]butyl)
    hexylamine],
2,2'-dithiobis[N-(2-[2-butenoxy)ethylamino]ethyl)ethyl-
    amine],
2,2'-dithiobis[N-(-2-[2-ethoxy-4-hexenylamino]ethyl)
    ethylamine],
2,2'-dithiobis[N-(2-[2-methoxyethylamino]-5-nonynyl)
    ethylamine],
2,2'-dithiobis[N-(2-[2-phenoxyethylamino]ethyl)ethyl-
    amine],
2,2'-dithiobis[N-(2-[2-naphthoxypropylamino]butyl)
    decylamine] and the like.

Another class of presently contemplated reactants include a hydroxy group as a substituent of an organic radical attached to the N atom of a bis(alkylamino) disulfide. This may be combined with the presence of ether oxygen atoms or an additional amino N atom in said organic radical. Illustrative of these compounds are bis[N-(hydroxyalkyl)alkylamine] compounds such as
2,2'-[dithiobis(ethyleneimino)]diethanol,
2,2'-[dithiobis(trimethyleneimino)]diethanol,
2,2'-[dithiobis(1,2-butyleneimino)]diethanol,
3,3'-[dithiobis(ethyleneimino)]dipropanol,
3,3'-[dithiobis(trimethyleneimino)]dipropanol,
3,3'-[dithiobis(1,2-butyleneimino)]dipropanol,
3,3'-[dithiobis(ethyleneimino)]bis(1,2-propanediol),
3,3'-[dithiobis(ethyleneimino)]bis[2-(hydroxymethyl)-
    1,2-propanediol],
4,4'-[dithiobis(ethyleneimino)]bis(1,2,3-butanetriol),
4,4'-[dithiobis(1,2-hexyleneimino)]bis(1,2,3-butane-
    triol),
3,3'-[dithiobis(ethyleneimino)]di-2-butanol,
3,3'-[dithiobis(ethyleneimino)]bis(2,2-dimethylpropa-
    nol), and so forth;

and compounds of the stated type containing unsaturation such as
2,2'-[dithiobis(ethyleneimino)]diphenol,
4,4'-[dithiobis(ethyleneimino)]bis(2-butene-1-ol),
4,4'-[dithiobis(trimethyleneimino)]bis(2-butyn-1-ol),
2,2'-[dithiobis(1,2-hexyleneimino)]bis[(2,4-dipropyl-
    phenyl)ethanol],
2,2'-[dithiobis(hexamethyleneimino)]bis(9-hexadecen-
    1-ol), and so forth.

Further illustrative thereof are those containing ether oxygen, such as those with saturated aliphatic hydrocarbon radicals like
4,4'-[dithiobis(2-[ethyleneimino]ethyleneoxy)]bis(1,2-
    butanediol),
2,2'-[dithiobis(2-[ethyleneimino]ethyleneoxy)]diethanol,
2,2'-[dithiobis(2-[1,2-propyleneimino)trimethyleneoxy)]
    bis(1,3,4-butanetriol),
3,3'-[dithiobis(2-[tetramethyleneimino]hexamethylene-
    oxy)]dibutanol,
7,7'-[dithiobis(2-[ethyleneimino]ethyleneoxy)]dihexa-
    decanol, as well as those with aliphatic unsaturation like
2,2'-[dithiobis(4-[ethyleneimino]-2-butenyleneoxy)]di-
    ethanol,
2,2'-[dithiobis(2-[ethyleneimino]trimethyleneoxy)]bis
    (3-buten-1-ol),
4,4'-[dithiobis(2-[ethyleneimino]ethyleneoxy)]bis(6-
    octyn-2-ol), and those with aromatic unsaturation like
2,2'-[dithiobis(2-[ethyleneimino]phenyleneoxy)]dietha-
    nol,
4,4'-[dithiobis(4[1,2-propyleneimino]phenyleneoxy)]bis
    (1,2-butanediol),
2,2'-[dithiobis(2-[1,2-butyleneimino]-4-phenylhexa-
    methyleneoxy)]diethanol,
2,2'-[dithiobis(2-[ethyleneimino]-3-naphthyltetramethyl-
    eneoxy)]dipropanol,
3,3'-[dithiobis(2-[ethyleneimino]-2-phenylethyleneoxy)]
    bis[2-(hydroxymethyl)-1,2-propanediol] and the like.

Still further illustrative of this class are those with a second amine group, such as those with saturated aliphatic radicals like
2,2'-[dithiobis(ethyleneiminoethyleneimino)]diethanol,
2,2'-[dithiozis(trimethyleneiminoethyleneimino)]bis(3,3-
    diethylhexanol),
3,3'-[dithiobis(1,2-cyclohexyleneiminoethyleneimino)]
    bis[2-(hydroxymethyl)-1,2-propanediol],
4,4'-[dithiobis(hexamethyleneimino-1,2-propyleneimi-
    no)]bis[1,2-butanediol],
2,2'-[dithiobis(ethyleneimino-2-[hydroxymethyl]hexa-
    methyleneimino)]diethanol,
2,2'-[dithiobis(ethyleneiminoethyleneoxyethyleneimino)]
    bis(1,3-propanediol), and those with unsaturated alphatic radicals like
2,2'-[dithiobis(ethyleneimino-1,4-hex-2-enyleneimino)]
    diethanol,
2,2'-[dithiobis(ethyleneiminohexamethyleneimino)]bis
    3-hexen-1-ol),
6,6'-[dithiobis(1,2-hexyleneiminotrimethyleneimino)]
    bis(4-hexen-1-ol),
2,2'-[dithiobis(1,2-butyleneiminotetramethyleneimino)]
    bis(4-hexyn-1-ol), as well as those with aromatic radicals like
2,2'-[dithiobis(ethyleneimino-1-phenylethyleneimino)]
    diethanol,
2,2'-[dithiobis(ethyleneimino-1,4-phenyleneimino)]bis
    (1-phenylethanol),
2,2'-[dithiobis(ethyleneiminoethyleneimino)]bis(4-phen-
    ylbutanol),
2,2'-[dithiobis(ethyleneiminohexamethyleneimino)]bis
    3-phenylhexadecanol),
2,2'-[dithiobis(ethyleneiminotrimethyleneimino)]bis(4-
    naphthylbutanol),
2,2'-[dithiobis(ethyleneiminoethyleneimino)]bis(1,3-di-
    phenylhexanol,
2,2'-[dithiobis(ethyleneimino-1-phenyl-1,4-hexyleneimi-
    no)]diethanol,
2,2'-[dithiobis(ethyleneiminoethyleneoxyethyleneimino)]
    bis(1,3,5-hexanetriol),
4,4'-[dithiobis(ethyleneimino-3-[hydroxymethyl]tetra-
    methyleneoxyethyleneimino)]bis[2,3-di(hydroxymeth-
    yl)-1,2-butanediol], and so forth.

Yet another group of compounds susceptible to conversion to Bunte compounds by the present method are those having various electron-withdrawing (electronegative) substituents on the organic radical attached to the N atoms of the disulfide compound, such as halogen (including F, Cl, Br and I), carboxy, cyano, carboalkyoxy, carbamylalkyl, and guanido. These are illustrated by disulfides such as 2,2'-dithiobis[N-(2-fluoroethyl)ethylamine],
2,2'-dithiobis[N-(2-chloroethyl)ethylamine],
2,2'-dithiobis[N-(3-bromopropyl)ethylamine],
2,2'-dithiobis[N-(4-iodobutyl)butylamine],
2,2'-dithiobis[N-(3,5-dichloropentyl)ethylamine],
2,2'-dithiobis[N-(6-fluoro-3-hexenyl)hexylamine],
2,2'-dithiobis[N-(4-chloro-2-butynyl)ethylamine],
3,3'-dithiobis[N-(p-chlorophenyl)propylamine],
2,2'-dithiobis[N-(p-bromobenzyl)decylamine],
2,2'-dithiobis[N-(o-chloro-p-isopropylphenyl)octyla-
    mine],
2,2'-[dithiobis(ethyleneimino)]bis[N-(2-chloroethyl)
    ethylamine],
2,2'-[dithiobis(hexamethyleneimino)]bis[N-(2-fluoro-
    octyl)cyclohexylamine],
2,2'-[dithiobis(1,2-dodecyleneimino)]bis[N-(2-chloro-4-
    hexenyl)propylamine],
2,2'-[dithiobis(1,4-cyclohexyleneimino)]bis[N-(m,p-di-
    chlorobenzyl)heptylamine],
2,2'-dithiobis[N-(2-[2-chloroethoxy]ethyl)ethylamine],
2,2'-dithiobis[N-(6-[2-iodobutoxy]hexyl)propylamine], 2,2'-dithiobis[N-(p-[8-chlorooctoxy]phenyl)hexylamine],
4,4'-dithiobis[N-(o-[2,3-difluoropropoxy]benzyl)octylamine],
2,2'-dithiobis[N-(2-[2-(2-chloroethoxy)ethylamino]ethyl)cyclohexylamine],
2,2'-[dithiobis(ethyleneimino)]bis(4-chlorobutanol),
2,2'-[dithiobis(hexamethyleneimino)]bis[6-(p-chlorophenyl)-1,3-hexanediol],
2,2'-[dithiobis(1,2-butyleneimino[2,3-dichlorotetramethyleneimino)]bis(4-hexyn-1-ol),
dithiobis(ethyleneimino)diacetic acid,
2,2'-dithiobis(1,2-hexadecyleneimino)bis(3-chloropropionic acid),
2,2'-dithiobis(hexamethyleneimino)bis[3-(2,4,5-trichlorophenoxy)propionic acid],
3,3'-dithiobis(1,2-but-3-enyleneimino)bis[naphthalenebutyric acid],
dithiobis(ethyleneimino)diacetonitrile,
dithiobis(ethyleneiminoethyleneimino)diacetonitrile,
3,3'-dithiobis(ethyleneiminoethyleneoxy)dipropionitrile,
2,2'-dithiobis(ethyleneimino)bis(3-hydroxypropionic acid),
diethyl 2,2'-dithiobis(ethyleneimino)diacetate,
dihexyl 2,2'-dithiobis(ethyleneimino)disalicylate,
dimethyl 2,2'-dithiobis(trimethyleneimino)bis(p-phenoxybenzoate),
dithiobis(ethyleneimino)diacetamide,
dithiobis(1,1-dimethylethyleneimino)bis(phenylacetamide),
2,2'-dithiobis(1,2-hexadecyleneimino)bis(3-hydroxypropionamide),
2,2'-dithiobis(ethyleneiminoethyleneoxy)bis[4-hydroxymethyl)valeramide],
2,2'-dithiobis[N-(2-guanidinoethyl)ethylamine] and so forth.

As will be appreciated from the foregoing illustrative examples, in the presently contemplated disulfides, the sulfide S atoms are each attached to a saturated aliphatic hydrocarbon radical having an amino N substituent. Attached to the said amino N substituent atoms are H and a hydrocarbon radical which may be aliphatic or aromatic, and saturated or unsaturated, and may have functional substituents. The stated hydrocarbon radical may in turn be joined to a second such hydrocarbon radical by a bridging group which is either an ether oxygen or an amino nitrogen atom, and this may in turn be joined to a third such hydrocarbon radical by the stated kind of bridging group. The stated functional substituents may include one or more hydroxy, halogen, carboxy, carbohydrocarbyloxy, carboxamido, cyano and guanidino groups. By formula, the stated disulfides may be represented as

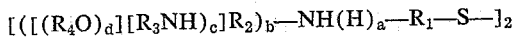

where $R_1$ is a saturated aliphatic hydrocarbon radical, $a$, $b$, $c$ and $d$ are integers of from 0 to 2, with one of $a$ and $b$ being 0 and the other 1, and $R_2$, $R_3$ and $R_4$ are each hydrocarbon radicals having from 0 to 5 substituents selected from hydroxy, halogen, carboxy, carboxamido, cyano, guanidino and

where $R_6$ is a saturated aliphatic hydrocarbon radical. The brackets on the groups containing $R_4$ and $R_3$ are to indicate that the stated groups may be attached to each other or to the $R_2$ radical in any sequence. In general, each of the hydrocarbon groups in the said compounds may contain from 1 to 18 carbon atoms; for stability, as will be appreciated, the hetero atoms (S, N, O) in the compounds will be separated from each other by at least two carbon atoms. The presently contemplated disulfides are known materials or can be prepared readily from known compounds by procedures known in the art, such as treatment of the corresponding mercaptans with oxidizing agents such as hydrogen peroxide, for example.

Usually the disulfides are conveniently utilized in the present method in the form of their acid addition salts, and in references to these compounds herein, it is intended to include the various acid addition salts corresponding to the stated amine compounds. These may be salts with inorganic acids such as hydrochloric, hydrobromic, sulfamic, phosphoric and nitric acids, or salts with organic acids such as maleic, succinic, and p-toluenesulfonic acids or the like. Usually it is convenient to use a halogen acid salt, and especially a hydrochloride. As mentioned above, the aminoalkyl thiosulfuric acids form inner salts, and the acid is eliminated from the aminoalkyl compounds in the course of reaction, as a result of inner salt formation. Thus the acid employed for addition salt formation is advantageously a cheap and light-weight acid like HCl.

The products of the present process are the thiosulfuric acid salts corresponding to the above-listed types of disulfides, having the same formula as the disulfide except that an —$SO_3H$ group is substituted for one of the two sulfur atoms and the organic radical attached to it. Thus, for example, from 2,2'-dithiobis[N-(guanidinoethyl)ethylamino] is produced S-[2-(2-guanidinoethylamino)ethyl]thiosulfuric acid, from 2,2'-dithiobis(ethyleneiminoethyleneloxy)bis[4-(hydroxymethyl)valeramide] is obtained S-(2-[2-(1-carboxamido-4-hydroxy-3-methylbutyloxy)ethylamino]ethyl)thiosulfuric acid, from dithiobis(ethyleneiminoethyleneimino)diacetonitrile is obtained S-(2-[2-(cyanomethylamino)ethylamino]ethyl)thiosulfuric acid, from 2,2'-dithiobis(hexamethyleneimino)bis[3-(2,4,5-trichlorophenoxy)]propionic acid is obtained S-6-[1-carboxy-2-(2,4,5-trichlorophenoxy)ethylamino]hexylthiosulfuric acid, from 2,2'-[dithiobis(ethyleneiminotrimethyleneimino)]bis(4-naphthylbutanol) is obtained S-[2-(3-[1-hydroxymethyl)-3-naphthylpropylamino]propylamino)ethyl]thiosulfuric acid, from 2,2'-[dithiobis(ethyleneimino-1,4-hex-2-enyleneimino)]diethanol is obtained S-(2-[1-ethyl-4-(2-hydroxyethylamino)-2-butenylamino]ethyl)thiosulfuric acid, from 2,2'-[dithiobis(2-[ethyleneimino]phenyleneoxy)]diethanol is obtained S-(2-[2-(2-hydroxyethoxy)phenylamino]ethyl)thiosulfuric acid, from 3,3'-[dithiobis(ethyleneimino)]bis(1,2-propanediol) is obtained S-[2-(2,3-dihydroxypropylamino)ethyl]thiosulfuric acid, and so forth.

Proceeding now to a consideration of the present method, this consists of contacting a disulfide of the stated description with excess sodium bisulfite in an aqueous solution containing hydrogen peroxide.

By "excess" sodium bisulfite is meant more than one equivalent (mole per mole) of the bisulfite per mole of disulfide. Preferably a large excess, amounting to at least 5 moles bisulfite, is introduced per mole of disulfide; even higher ratios, such as up to 30 moles per mole, may be used. The amount of hydrogen peroxide present will be at least about one-half mole per mole of disulfide, and higher ratios, extending to 5 or 10 moles per mole, may be employed; preferably, 0.5 to 1.5 mole per mole of disulfide is used.

The procedure for conducting the present method consists in contacting the stated reactants in an aqueous medium. The hydrogen peroxide is preferably in dilute solution: below 30% concentration, and preferably below 10%: about 3% is suitable. The reactants may be mixed all at once or, advantageously, the peroxide may be added as a dilute solution to an aqueous solution of the bisulfite and the disulfide. To provide desirably high yields, the reactants will be left in contact until conversion of the disulfide to Bunte compound is substantially complete. Temperatures of reaction may range from the freezing temperature of the reaction mixture to elevated temperatures below the decomposition temperature of the reaction mixture components. Generally, suitable temperatures are in the range of 0° to 100° C., and room temperature (20–25° C.) is usually preferable. On completion of the reaction, the product may be recovered by usual techniques such as distillation, extraction, precipitation and the like.

Certain of the products of the present method such as the S-[(hydroxyalkylamino)alkyl]thiosulfuric acids are useful as physiological agents. To produce Bunte compounds for use for this purpose it may be desirable to purify the products by treatment with an ion exchange resin. Suitable ion exchange resins are strongly basic quaternary ammonium chloride salts, such as the resin produced by reacting a cross-linked polystyrene with a trialkylamine to produce quaternary ammonium chloride group substituents on the resin. The Bunte compound is placed on a column of the resin in solution, and then the column is eluted with solvent, thereby removing inorganic salt contaminants such as sodium chloride; thereafter, the Bunte compound can be eluted from the column and recovered in substantially pure form.

The invention is illustrated but not limited by the following examples.

Example 1

This example illustrates operation of the method of this invention on a bis[N-(hydroxyalkyl)alkylamine] disulfide.

To a solution of 46.5 grams (g.) sodium bisulfite (0.448 mole) in 250 ml. of water stirred at room temperature is added, all at once, 7 g. of 2,2'-[dithiobis(ethyleneimino)]diethanol dihydrochloride (0.0224 mole). After 30 minutes, the addition of 3% hydrogen peroxide (13 g., 0.0114 mole) is begun and is completed in 10 minutes. Stirring is continued for 30 minutes, and then an additional 13 g. of 3% hydrogen peroxide solution is added dropwise over a 20 minute period. Stirring is continued for 30 minutes after which the reaction mixture is allowed to stand overnight at room temperature. Water is removed from the reaction mixture on a flash evaporator to give a semi-solid residue which is extracted with 100 ml. of methanol. The removal of solvent from the methanol extract leaves a semi-solid residue which is extracted with 50 ml. of methanol followed by extraction with 25 ml. of methanol. Removal of solvent from the combined methanol extracts leaves a pasty residue, most of which redissolves in 50 ml. of methanol. Filtration of this mixture and concentration of the filtrate leaves a 12 g. viscous residue which is redissolved in 60 ml. of methanol prior to desalting via ion exclusion.

The solution is passed through a column of "Dowex 1–X4" anion exchange resin, chloride ion form, 20–50 mesh (wet resin bed dimensions, 2 cm. x 50 cm.). The column is eluted successively with 200 ml. of methanol, 120 ml. of aqueous methanol (1:1 mixture by volume), and 700 ml. of water. The first 320 ml. of eluant contains sodium chloride and organic impurities, and the last 700 ml. of eluant contain the product, mostly in the first 300 ml. of water elutions. The removal of water from this first 300 ml. of water eluant leaves a viscous oil which is triturated in 100 ml. of absolute ethanol to give 5.5 g. of S-[2-(2-hydroxyethylamino)ethyl]thiosulfuric acid, M.P. 104–106° C. The melting point of a mixture of this product and an authentic sample of S-2-(2-hydroxyethyl)aminoethylthiosulfuric acid is not depressed below 104° C. The mother liquor from the 5.5 g. crop above is combined with a 1.5 g. oily residue from the last 400 ml. of eluant and evaporated to dryness. The 2 g. semi-solid residue is crystallized from a mixture of 10 ml. of methanol and 40 ml. of absolute ethanol to give 0.8 g. of product, M.P. 103–105° C. The total yield of substantially pure product is thus 6.3 g., which is equal to 70% of theoretical, calculated on the disulfide starting material.

By contrast, the yield by the same procedure but omitting the hydrogen peroxide is only 41% of theoretical.

The disulfide employed in this example is prepared by addition of 147 g. of hydrogen peroxide (0.13 mole), as a 3% solution, to a stirred solution of 31.4 g. of 2-(2-mercaptoethylamino)ethanol (0.259 mole) in 100 ml. of water cooled in an ice water bath, over a period of 1 hour. The solution is then acidified by addition of 43 ml. of 6 N HCl. Removal of water leaves an oil, which is triturated with 200 ml. of isopropanol to give 35 g. of crude product. This is recrystallized from 500 ml. of absolute ethanol to give 28 g. of analytically pure 2,2'-[dithiobis(ethyleneimino)]diethanol dihydrochloride, M.P. 144–146° C. The 2-(2-mercaptoethylamino)ethanol is prepared by adding a benzene solution of 5.5 g. of ethylene sulfide to an anhydrous solution of 56 g. of 2-aminoethanol in a mixture of 32 g. ethanol and 288 g. benzene, over 3–4 hours. Refluxing for another hour is followed by removal of solvent and recovery of 2-(2-mercaptoethylamino)ethanol, M.P. 55–60° C.

Example 2

This example illustrates operation of the method of this invention with another bis[(hydroxyalkylamino)-alkyl]disulfide.

A solution of 13 g. of 4,4'-[dithiobis(ethyleneimino)]bis(1,2,3-butanetriol) dihydrochloride in 50 ml. of water is added all at once to a stirred solution of sodium bisulfite (62.4 g., 0.6 mole) in 200 ml. of water at room temperature. A 3% solution of hydrogen peroxide (46 g., 0.04 mole) is aded dropwise in 30 minutes. Stirring is continued for 20 minutes after which water is removed from the reaction mixture on a flash evaporator. The semi-solid residue is extracted with 100 ml. of methanol. Removal of solvent from the methanol extract leaves a semi-solid residue that is extracted with 60 ml. of methanol. Removal of methanol from this extract leaves a viscous oil that is mostly redissolved in 40 ml. of methanol. The methanol solution is allowed to stand overnight and then filtered. The filtrate is diluted to 75 ml. with methanol prior to passage through a 2 x 50 cm. (wet bed dimensions) column of Dowex 1–X4 anion exchange resin (chloride ion form, 20–50 mesh). The column is eluted with 200 ml. of methanol, 100 ml. of a 1:1 mixture of methanol and water, and 460 ml. of water in that order. Salt and an organic contaminant are contained in the methanol and methanol-water eluant. Removal of water from the first 240 ml. of the water eluant leaves a viscous residue that is dried on a rotary evaporator at 50° C./1.5 mm. for 6 hours to give 8 g. of S-[2-(2,3,4-trihydroxybutylamino)ethyl]thiosulfuric acid, as a colorless, taffy-like substance.

*Analysis.*—Calcd. for $C_6H_{15}NO_6S_2$: C, 27.6; H, 5.8; N, 5.4; S, 24.5. Found: C, 27.3; H, 6.1; N, 5.4; S, 23.7.

To prepare the disulfide, 3,4-epoxy-1,2-butanediol is produced by adding 1 mole of m-chloroperbenzoic acid to 1.14 mole of 3-butene-1,2-diol, removing solvent, triturating with water, filtering, and evaporating the filtrate to recover the epoxide as an oil, B.P. 80–81° C./0.08 mm., $n_D^{25}$ 1.4677, $d_4^{25}$ 1.2369. The epoxide (0.3 mole) is added to 2-(benzylthio)ethylamine (0.9 mole) in methanol, and the mixture refluxed. The reaction mixture is evaporated down and the residue acidified with HCl. The resulting oil is dried and dissolved in absolute ethanol, producing a precipitate of 4-[2-(benzylthio)ethylamino]-1,2,3-butanetriol hydrochloride, M.P. 80–85° C. A slurry of 0.15 mole of this product in ethyl ether is added to 500 ml. of anhydrous ammonia, and 16.5 g. of sodium is added to this mixture. Evaporation of the resulting mixture under vacuum leaves a residue which is acidified with aqueous HCl. The aqueous solution is extracted with ether and evaporated down to produce a residue that is dried with isopropanol and then extracted with ethanol. Removal of ethanol from the extracts gives 4-(2-mercaptoethylamino)-1,2,3-butanetriol hydrochloride as a colorless glass. A solution of 0.07 mole of this mercaptoethyl compound in water is mixed with 0.35 mole of hydrogen peroxide at room temperature to produce 4,4'-[dithiobis(ethyleneimino)]-bis(1,2,3-butanetriol).

*Example 3*

This example illustrates operation of the method of this invention for conversion of still another bis[(hydroxyalkylamino)alkyl] disulfide to a thiosulfuric acid salt.

A mixture of 24 g. (0.064 mole) of 2,2'-dithio-bis-(ethyleneimino)bis(1,3 - propanediol) dihydrochloride, and 136 g. (0.13 mole) of sodium bisulfite in 500 ml. of water is stirred at room temperature for 0.5 hour. Then 73 g. of a 3% aqueous solution of hydrogen peroxide (0.065 mole) is added in 0.6 hour, and stirring is continued for another 2 hours. Water is evaporated from the reaction mixture under vacuum and the residue is extracted with 250 ml. of methanol. The methanol is evaporated from the extract and the residue from this is extracted with 100 ml. of methanol; the methanol is removed from this second extract, and the residue dissolved in 50 ml. of methanol. After filtration, the solution is diluted to a volume of 100 ml. with methanol, and the 100 ml. are put into a column of 200 g. of strongly basic anion exchange resin (chloride form, wet bed dimensions 1 x 24 inches). The bed is eluted with 500 ml. of methanol, 200 ml. of a 1:1 methanol:water mixture, and 1100 ml. of water. The last 1200 ml. of eluant are combined and flash-evaporated to an oily residue. Trituration of the oil with 100 ml. of ethanol produces a white fluffy solid, which is filtered off and dried. The product is 18 g. (about 60% of theoretical yield) of S-2-(N-[2-hydroxy-1-(hydroxymethyl)ethyl]aminoethyl) thiosulfuric acid, M.P. 108–111° C.

The disulfide used to make the stated thiosulfuric acid compound is produced by adding 170 g. of 3% hydrogen peroxide (0.15 mole) to 56 g. (0.3 mole) of 2-(2-mercaptoethylamino)-1,3-propanediol hydrochloride in 100 ml. of water, stirring 4 hours, removing water and drying the residue with isopropanol. The residue is then dissolved in 500 ml. of warm methanol, addition to which of 500 ml. of ethanol and 500 ml. of ether gives 2,2'-dithiobis(ethyleneimino)bis(1,3 - propanediol) dihydrochloride M.P. 129–131°. To prepare the stated mercaptan compound, 60 g. (0.3 mole) of 5-chloro-2-phenyl-m-dioxane is refluxed with 167 g. (1.0 mole) of 2-(benzylthio)ethylamine and 63.6 g. (0.6 mole) of sodium carbonate in 250 ml. of ethanol for 42 hours. Filtration and removal of solvent by evaporation is followed by removal of unreacted starting materials by distillation. The residue comprises 5-[2-(benzylthio)ethylamino]-2-phenyl-m-dioxane, which is hydrolyzed by addition of 50 ml. water and 20 ml. 6 N HCl. The resulting mixture is extracted with diethylether, the remaining aqueous solution is decolorized with charcoal, and the water is removed to provide 2-[2-(benzylthio)ethylamino]-1,3-propanediol hydrochloride, M.P. 93–95° C. This product (27.8 g.) is debenzylated by addition of sodium (9.6 g.) in a mixture of liquid ammonia and ether; the reaction product is evaporated down and the residue acidified with HCl. After extraction with ether, water is removed from the aqueous layer, and the dried product is dissolved in warm ethanol and filtered to recover 2-(2-mercaptoethylamino)-1,3-propanediol hydrochloride as an oil.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. In the process wherein a bis(aminoalkyl)disulfide acid addition salt is reacted with sodium bisulfite at a temperature between 0° C. to 100° C. to produce a thiosulfuric acid ester, the improvement wherein the molar ratio of sodium bisulfate to said bis(aminoalkyl)disulfide acid addition salt is from about 5:1 to about 30:1 and said acid addition salt and said bisulfite are reacted in a solution comprising hydrogen peroxide in amounts corresponding to a molar ratio of hydrogen peroxide to said bis (aminoalkyl)disulfide acid addition salt from about 0.5:1 to about 10:1.

2. The method of claim 1 in which said bis(aminoalkyl)disulfide is a bis(N-substituted-aminoalkyl)disulfide in which the N substituent is a hydrocarbon radical having at least one hydroxyl substituent.

3. The process of claim 1 wherein said bis(aminoalkyl) disulfide is 2,2'-[dithiobis(ethyleneimino)]diethanol dihydrochloride.

4. The process of claim 1 wherein said bis(aminoalkyl) disulfide is 4,4' - [dithiobis(ethyleneimino)]bis(1,2,3-butanetriol)dihydrochloride.

References Cited

Milligan et al., Reviews of Pure and Applied Chemistry, vol. 12, p. 75 (1962).

JOSEPH P. BRUST, *Primary Examiner.*